UNITED STATES PATENT OFFICE.

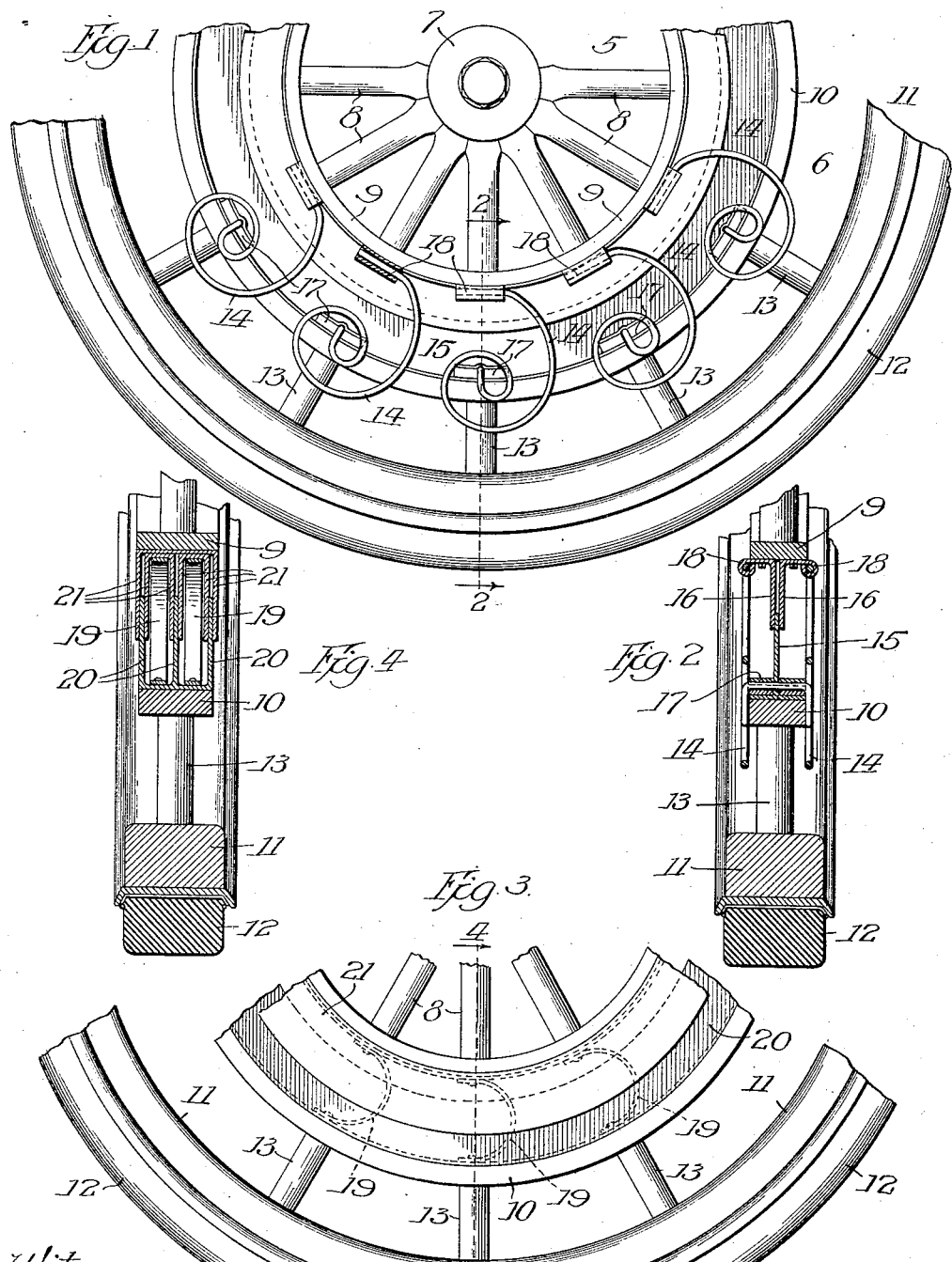

THACKSTON THOMAS, OF MUTUAL, OKLAHOMA.

VEHICLE-WHEEL.

1,051,927.  Specification of Letters Patent.  Patented Feb. 4, 1913.

Application filed April 8, 1911. Serial No. 619,668.

*To all whom it may concern:*

Be it known that I, THACKSTON THOMAS, a citizen of the United States, residing at Mutual, in the county of Woodward and State of Oklahoma, have invented certain new and useful Improvements in Vehicle-Wheels, of which the following is a specification.

This invention relates to new and useful improvements in vehicle wheels such as are adapted to be used on automobiles and other vehicles and is adapted to absorb the shocks and jars incident to the travel of the wheel over rough and uneven surfaces, thus performing the function of the expensive pneumatic tires which are now commonly employed.

It is an object of this invention to provide a wheel in which the shocks and jars shall be taken up by springs interposed between the rim and hub of the wheel, the principal aim being to relieve the springs of the lateral thrusts to which the wheel is subjected in use and to provide means for preventing the wheel rim from being displaced laterally relatively to the hub, and furthermore to provide a wheel which shall be light, but strong and durable.

My invention will be best understood by reference to the following description when taken in connection with the accompanying drawings which illustrate two preferred embodiments thereof.

Referring to the drawings—Figure 1 is a side elevation of a fragment of a wheel embodying one form of my invention. Fig. 2 is a sectional elevation on the line 2—2 of Fig. 1. Fig. 3 is a side elevation of a fragment of a wheel embodying another form of my invention; and Fig. 4 is a sectional elevation on the line 4—4 of Fig. 3.

Referring now to Figs. 1 and 2 it will be observed that the wheel consists of a rigid central portion 5 and an outer annular portion 6 surrounding said central portion but spaced therefrom. The central portion in the present instance preferably comprises a hub 7, a plurality of spokes 8 and a rim 9. The outer portion comprises a circular member 10, a felly 11 to which is attached a tire 12 preferably formed of hard rubber and a series of short radially disposed spokes 13 rigidly connecting the circular member with the felly. The rim 9 of the central portion and the circular member 10 of the outer portion are connected at intervals by springs 14.

In order to prevent relative lateral movement between the central and outer portions of the wheel so that the wheel rim can not be displaced longitudinally of the hub and in order to transmit lateral thrusts imparted to the other portion I have provided means connecting the two portions which permits movement of the portions toward and from each other but prevents relative lateral movement between the portions. This means as shown in Fig. 2, comprises, in the present instance, an annular member 15 bolted or otherwise rigidly secured to the inner face of the circular member 10 so as to project inwardly radially of the wheel and a plurality of annular members 16 bolted or otherwise rigidly secured to the outer face of the rim 9 and projecting outwardly radially of the wheel on each side of the member 15. The members 16 act as guides for the member 15 and the construction as a whole permits the circular member 10 to move toward and from the rim 9 but prevents relative lateral movement between these parts. The springs are shown as double springs having a transverse portion 16 seated in a saddle 17 on the inner face of the circular member 10, said springs being coiled around this transverse portion and the free ends being secured in sockets 18 mounted on the rim 9. These sockets are preferably formed by bending over the protruding edges of the bases of the members 16. The springs absorb the shocks to which the rim of the wheel is subjected and cushion the movement of the outer member toward and from the central portion and the interengaging guides while permitting this cushioning movement to take place prevent the outer portion of the wheel from being displaced relatively to the central portion.

In the embodiment of my invention shown in Figs. 3 and 4 a different type of spring is employed which is shown as a semi-circular or semi-elliptical spring 19 secured at one end to the outer face of the rim 9 and at its other end to the inner face of the circular member 10. These springs are arranged in pairs located side by side at intervals between the central and outer portions of the wheel. In order to insure greater resistance of the wheel against lateral thrusts I have in the present instance provided the inner face of the circular member 10 with three inwardly projecting guide members 20 and have provided the rim 9 with six outwardly projecting guide members 21 arranged in pairs and adapted to engage the opposite faces of the inwardly projecting guide members 20. The springs 19 are disposed between the inwardly and outwardly projecting guide members so that they are completely inclosed in a casing, as it were, and hidden from view. The guide members which are secured to the rim 9 in the present instance may be formed of three channel members, one being of substantially the same width as the rim 9 and the other two being narrower; the inwardly projecting members 20 being disposed outside of the narrow channel members and inside of the wide member. This construction produces a strong, rigid connection between the inner and outer members of the wheel which effectually prevents any lateral displacement of the parts but at the same time permits yielding radial movement of the wheel portions sufficient to absorb any shocks or jars to which the wheel may be subjected.

It is believed that the construction and many advantages of my invention will be understood from the foregoing without further description and it will be obvious that various minor mechanical changes in the size, shape and arrangement of the various parts may be resorted to without departing from the spirit or sacrificing any of the material advantages of the invention.

I claim—

1. In a vehicle wheel, the combination of a hub, a plurality of radially disposed spokes connected thereto, a portion of the spokes being cut away at equal distances from the center of the said hub, springs replacing the said cutaway portions, means connecting the inner ends of the springs rigidly together and to the spokes, means connecting the outer ends of the springs rigidly together and to the spokes, and a guide disposed between the means connecting the inner ends of the springs and the means connecting the outer ends of the springs for preventing lateral movement of the one means relative to the other.

2. In a vehicle wheel, the combination of a hub, a plurality of radially disposed spokes connected to the said hub, each having a portion cut away, a pair of springs replacing each cutaway portion, means rigidly connecting together the inner ends of all the springs, means rigidly connecting together the outer ends of all the springs, and means interposed between the means connecting the outer ends and inner ends of the springs to prevent lateral movement of one connecting means relative to the other.

THACKSTON THOMAS.

Witnesses:
L. A. Foster,
N. L. Foster.

Copies of this patent may be obtained for five cents each, by addressing the "Commissioner of Patents, Washington, D. C."